United States Patent [19]

Scott et al.

[11] 4,383,135

[45] May 10, 1983

[54] METHOD AND APPARATUS FOR SPEECH RECOGNITION

[75] Inventors: Brian L. Scott; Lee H. Hardesty, both of Denton, Tex.

[73] Assignee: Scott Instruments Corporation, Denton, Tex.

[21] Appl. No.: 114,724

[22] Filed: Jan. 23, 1980

[51] Int. Cl.[3] ............................................. G10L 1/00
[52] U.S. Cl. ................................ 179/1 SD; 364/513
[58] Field of Search ............... 179/1 SD, 1 SA, 1 SC, 179/1 SB; 340/146.3 WD, 148; 364/482, 724

[56] References Cited

U.S. PATENT DOCUMENTS

| | | | |
|---|---|---|---|
| 3,247,322 | 4/1966 | Savage et al. | 179/1 SD |
| 3,499,987 | 3/1970 | Focht | 179/1 SD |
| 3,507,999 | 4/1970 | Schroeder | 179/1 |
| 3,553,372 | 1/1971 | Wright | 179/1 SD |
| 3,582,559 | 6/1971 | Hitchcock | 179/1 SB |
| 3,740,476 | 6/1973 | Atal | 179/1 SA |
| 3,742,146 | 6/1973 | Newman et al. | 179/1 SD |
| 3,808,370 | 4/1974 | Jackson et al. | 179/1 SA |
| 3,855,416 | 12/1974 | Fuller | 179/1 SA |
| 3,855,417 | 12/1974 | Fuller | 179/1 SA |
| 3,919,481 | 11/1975 | Kalfaran | 179/1 SA |
| 4,074,069 | 2/1978 | Tokura et al. | 179/1 SC |
| 4,092,493 | 5/1978 | Rabiner et al. | 179/1 SD |
| 4,100,370 | 7/1978 | Suzuki | 179/1 SD |
| 4,181,821 | 1/1980 | Pirz et al. | 179/1 SD |

Primary Examiner—Emanuel S. Kemeny
Attorney, Agent, or Firm—Richards, Harris & Medlock

[57] ABSTRACT

Recognition of human speech is carried out by storing a template for each unit of speech to produce a dictionary of stored words and phrases. A given speech signal is converted to produce a template which is compared to the stored template to find the closest comparison. The word or phrase corresponding to the identified template is produced and displayed to complete the recognition of the speech signal. The speech signal is processed to produce two separate frequency components. The frequency components are processed to produce a DC signal proportional to the frequency of the frequency component. The frequency components are also rectified to produce amplitude signals corresponding to the envelope of the frequency components. The products $[F_1][F_2]$ and $[A_1][A_2]$ and ratios $F_1/F_2$ and $A_1/A_2$ of the pairs of frequency and amplitude signals are produced to generate a plurality of relational signals which comprise the templates corresponding to each speech signal. In building the dictionary each speech sample is submitted a number of times to produce an average template value together with the variants for each data point.

26 Claims, 9 Drawing Figures

METHOD AND APPARATUS FOR SPEECH RECOGNITION

FIELD OF THE INVENTION

This invention pertains to the electronic recognition of speech and more particularly to a method and apparatus for recognizing speech based on the relational characteristics of signal components comprising the speech signal.

BACKGROUND OF THE INVENTION

It has heretofore been realized that speech recognition circuitry coupled with a computer can be used to great advantage in a wide variety of tasks. Typically, the interface between a computer and a human operator has been a mechanical keyboard. A keyboard interface has a number of disadvantages including slow speed, expense, the need for training for the operator and the limitations that the operators hands are fully occupied and cannot be used for other purposes.

Despite the apparent advantages of speech recognition as an interface between human operators and a computer only limited success has been achieved to date. Numerous obstacles must be overcome before a successful speech recognition system can be implemented at a reasonable cost. A number of problems in designing such a system include the variability of speech from one person to another, the need to produce an accurate template representing each speech unit and the need for a high speed computer having rapidly accessible mass memory to handle the size of vocabulary needed for a useful application.

There exists a need for speech recognition apparatus which is capable of producing speech templates that are essentially independent of the speaker.

SUMMARY OF THE INVENTION

The present invention is a method and apparatus for producing a template to represent an audio signal so that a given audio signal can be compared to a dictionary of stored templates representing audio signals in order to identify the unknown audio signal. Each of the stored audio signals includes the word or phrase represented by the signal. When the unknown audio signal is identified with a stored signal, the corresponding word or phrase is produced and displayed to the operator. The present invention provides for the recognition of speech for the production of corresponding text.

The method of the present invention for producing a template to represent an audio signal comprises the steps of extracting a plurality of signal components from the audio signal, producing one or more relational signals each of which is proportional to a plurality of said signal components, and storing the relational signals to serve as the templates which represent each of the audio signals.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
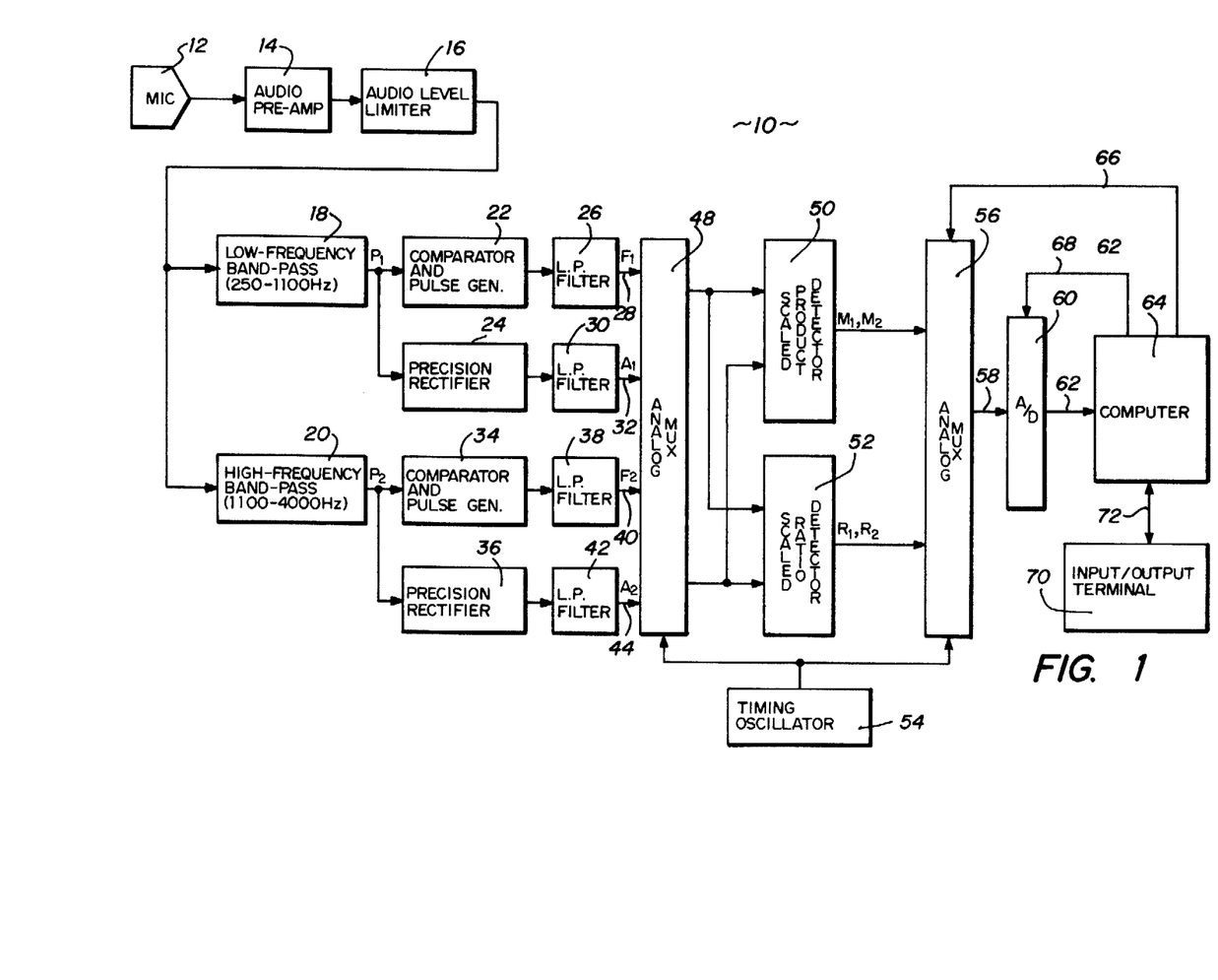
FIG. 1 is a block diagram of the speech recognition apparatus in accordance with the present invention.

The present invention comprises a method and apparatus for the recognition of human speech. Referring to FIG. 1, there is shown a block diagram of a first embodiment of the speech recognition apparatus of the present invention. A speech recognition circuit 10 receives human speech at a microphone 12 which generates an audio signal that is transferred sequentially through an audio preamplifier 14 and an audio level limiter 16. The audio signal generated at the output of limiter 16 is provided as inputs to a low frequency band pass filter 18 and a high frequency band pass filter 20. Filter 18 is designed to have a pass band covering the range of 250 to 1100 Hz. High frequency filter 20 is designed to have a pass band in the range of 1100 to 4500 Hz. The low frequency component $P_1$ of the input audio signal is produced as the output of band pass filter 18 and the high frequency component $P_2$ of the input audio signal is produced as the output of band pass filter 20.

The low frequency audio component $P_1$ from filter 18 is input to both a comparator and pulse generator 22 and a precision rectifier 24. In the comparator and pulse generator 22 the low frequency component audio signal $P_1$ is zero crossing detected to generate a pulse train corresponding to the frequency of audio signal $P_1$. The pulse train generated by circuit 22 is passed through a low pass filter 26 which produces a DC voltage $F_1$ on line 28, the signal $F_1$ being proportional to the instantaneous frequency of the audio signal component $P_1$ input to comparator and pulse generator 22.

The low frequency audio signal $P_1$ is rectified in circuit 24 and the rectified signal is passed through a low pass filter 30 to generate a DC amplitude signal $A_1$ on line 32. Signal $A_1$ is proportional to the amplitude of the low frequency audio signal $P_1$ produced at the output of filter 18.

The high frequency audio component $P_2$ received from the high frequency filter 20 is input to both a comparator and pulse generator 34 and a precision rectifier 36. Within the comparator and pulse generator 34 the high frequency component signal $P_2$ is zero crossing detected to produce a pulse train corresponding to the frequency of signal $P_2$. The pulse train is input to a low pass filter 38 to generate a DC signal $F_2$ on line 40. Signal $F_2$ is a DC voltage which is proportional to the frequency of the high frequency audio signal component $P_2$.

The high frequency component $P_2$ of the audio signal which is extracted by the filter 20 is supplied as an input to precision rectifier 36 and the rectified output thereof is input to a low pass filter 42 to produce a signal $A_2$ on line 44, signal $A_2$ being proportional to the amplitude of the high frequency signal $P_2$.

Each of the DC signals $F_1$, $F_2$, $A_1$ and $A_2$ are input to an analog multiplexer 48. These analog signals are selectively routed by multiplexer 48 so that they are provided to a scaled product detector 50 and a scaled ratio detector 52. The analog signals are routed in a time sequence controlled by clock signals provided by a timing oscillator 54.

The scaled product detector 50 produces two analog output signals. These are signals $M_1$ and $M_2$. Signal $M_1$ is proportional to the product of the frequency signals $F_1$ and $F_2$. Signal $M_2$ is proportional to the product of the amplitude signals $A_1$ and $A_2$.

The scaled ratio detector 52 produces signals $R_1$ and $R_2$ where $R_1$ is proportional to the ratio of $F_2$ to $F_1$ and $R_2$ is the ratio of $A_1$ to $A_2$.

In the preferred embodiment of the invention the signals $M_1$, $M_2$, $R_1$ and $R_2$ are defined as follows:

$$R_1 = \frac{F_2 + k_1}{F_1 + k_2}$$

$$R_2 = \frac{A_1 + k_1}{A_2 + k_2}$$

$$M_1 = [F_1 + k_3][F_2 + k_4]$$
$$M_2 = [A_1 + k_3][A_2 + k_4]$$

The constants $k_1$, $k_2$, $k_3$ and $k_4$ are selectable by the operator. The constants $k_1$, $k_2$, $k_3$ and $k_4$ are provided as scaling factors.

The product signals $M_1$ and $M_2$ from the scaled product detector 50 are input sequentially to an analog multiplexer 56. Likewise, the ratio signals $R_1$ and $R_2$ from the scaled ratio detector 52 are sequentially input to analog multiplexer 56. The clock signals generated by timing oscillator 54 are also provided to multiplexer 56 to provide coordinated sequential operation. The signals provided as inputs to analog multiplexer 56 are sequentially routed through line 58 to an analog to digital converter 60. The analog to digital converter 60 samples the analog signals $M_1$, $M_2$, $R_1$ and $R_2$ as they are provided and produces a digital word corresponding to each of the samples. The digital words are transferred over data lines 62 to a digital computer 64. The data words are stored in digital computer 64 for further processing or retrieval. The sequence of operations for transferring the analog signals from multiplexer 56 to analog to digital converter 60 and then the transfer of digital words from converter 60 to computer 64 is carried out under the control of signals produced by computer 64 and transferred over lines 66 and 68.

An input/output terminal 70 is connected to computer 64 through a bi-directional transmission path 72. An operator can enter information through terminal 70 to the computer 64 and can receive information generated by computer 64 and displayed at terminal 70.

The functional blocks described in reference to FIG. 1 are illustrated in detailed schematic form in FIGS. 2-8. The audio preamplifier 14 and audio level limiter 16 are shown in schematic circuit form in FIG. 2. The microphone 12 is connected through an input connector 82 and the series combination of a capacitor 84 and resistor 86. A resistor 88 is connected between the junction of capacitor 84 and resistor 86 and ground. The audio signal generated by microphone 12 is supplied to the noninverting input of an amplifier 90 which serves as a basic audio preamplifier. The inverting input to amplifier 90 is connected to a series combination of resistor 92 and a capacitor 94 which is connected at one terminal to ground.

Figure 2:
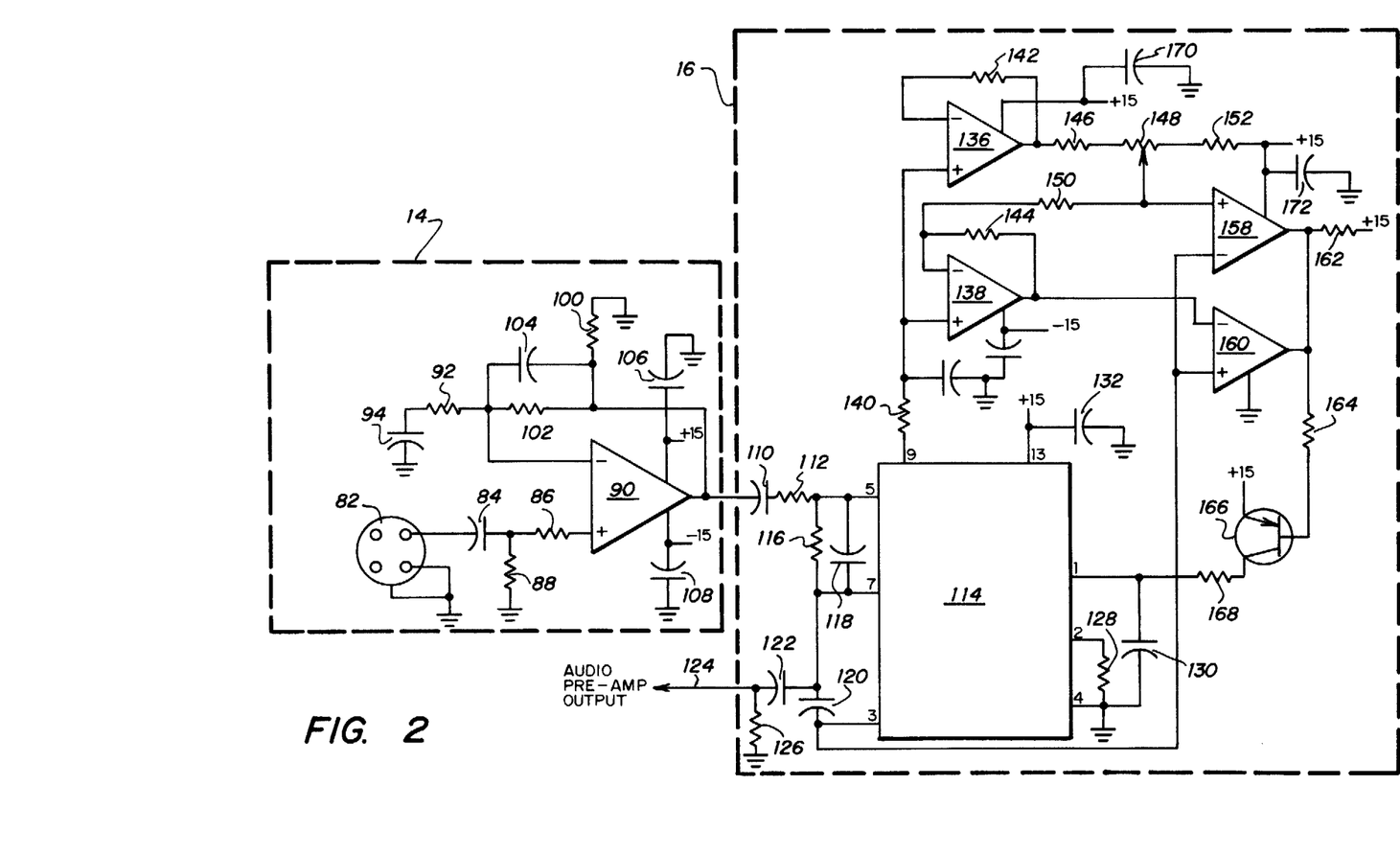
FIG. 2 is a circuit diagram of the audio preamplifier and audio level limiter shown in FIG. 1.

The output of amplifier 90 is connected to a grounded resistor 100 and through a feedback network to the inverting input of the amplifier. The feedback network comprises the parallel combination of a resistor 102 with a capacitor 104. Bypass capacitors 106 and 108 are connected respectively to the +15 v. and −15 v. power supply terminals of amplifier 90.

The output of audio preamplifier 14 is input to the audio level limiter 16 through a coupling capacitor 110 and an input resistor 112 to an audio compander 114. Terminals 5 and 7 of compander 114 are interconnected by a parallel combination of resistor 116 and capacitor 118. A capacitor 120 is connected between terminals 7 and 3. A capacitor 122 couples the output of audio compander 114 to the output line 124 of the audio preamp circuit. A discharge resistor 126 is connected between the output line 124 and ground. A resistor 128 is connected between pins 2 and 4 of compander 114 while a capacitor 130 is connected between pins 1 and 4. Pin 4 of compander 114 is grounded. A bypass capacitor 132 is connected between pin 13 and ground while pin 13 is connected to the +15 volt power supply line.

Dual operational amplifiers 136 and 138 receive through input resistor 140 the output of pin 9 of compander 114. Amplifiers 136 and 138 are utilized to track the limited audio signal and provide positive and negative references from the compander 114 bias voltages. Amplifier 136 is fitted with a feedback resistor 142 for gain control and amplifier 138 is equipped with a similar resistor 144. The output of amplifier 136 is connected to a load resistor 146, a potentiometer 148 and a resistor 150 to the inverting input of operational amplifier 138. Potentiometer 148 serves to adjust the limiter threshold. A resistor 152 is connected between potentiometer 148 and the +15 volt power terminal.

Operational amplifiers 158 and 160 are connected as voltage comparators with common outputs. The noninverting input of amplifier 158 is connected to the wiper of potentiometer 148 which receives the output signal of amplifier 136. The inverting input of amplifier 160 is connected to directly receive the output of amplifier 138. Pin 3 of audio compander 114 is connected to the inverting input of amplifier 158 and the noninverting input of 160. The outputs of amplifiers 158 and 160 are connected through a bias resistor 162 to the +15 v. supply and through a resistor 164 to the base of a transistor 166. A collector resistor 168 connects transistor 166 to pin 1 of compander 114.

The operational amplifiers 136 and 158 are respectively equipped with bypass capacitors 170 and 172 connected to the power supply terminals thereon.

Figure 3:
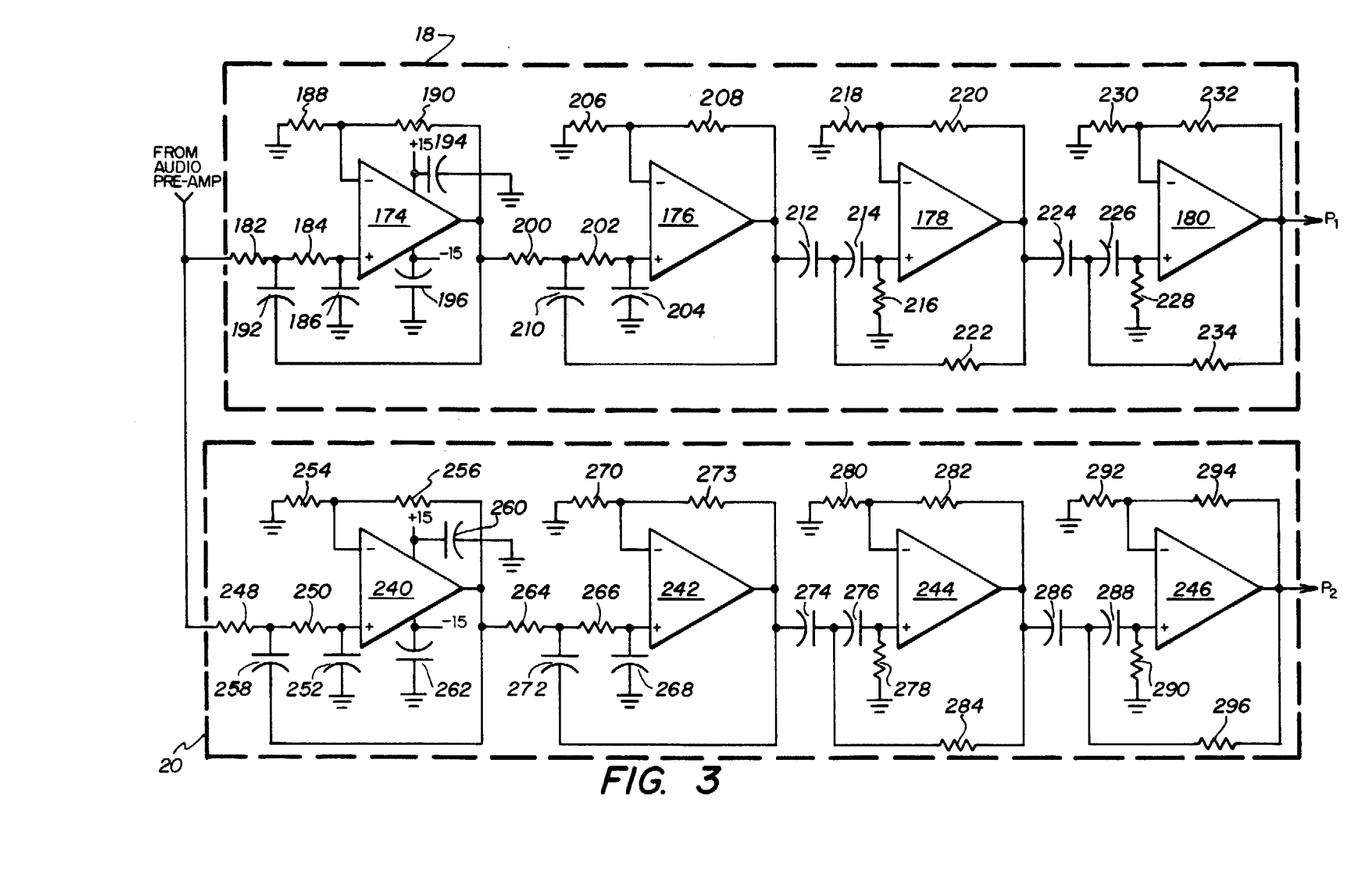
FIG. 3 is a circuit diagram of the band pass filters shown in FIG. 1.

Band pass filters 18 and 20 are illustrated in FIG. 3. The output of the audio level limiter 16 is provided to the inputs of both filters 18 and 20. Band pass filter 18 comprises a series combination of four operational amplifiers 174–180. The output of the audio level limiter 16 is supplied through an input resistor 182 in a low pass filter combination of a resistor 184 and a capacitor 186. The output of this low pass filter combination is connected to the noninverting input of amplifier 174. The inverting input of amplifier 174 is connected to a resistor 188 which is grounded at the opposite terminal. Amplifier 174 is equipped with a feedback resistor 190 connecting the output to the inverting input. A feedback capacitor 192 connects the output of the amplifier to the input of the low pass filter comprising resistor 184 and capacitor 186. Amplifier 174 is also equipped with bypass capacitors 194 and 196 at the power supply terminals. Amplifiers 176, 178 and 180 are provided with similar bypass capacitors (not shown).

The output of amplifier 194 is connected through a load resistor 200 to a low pass filter comprising resistor 202 and capacitor 204. The junction of this resistor and capacitor is connected to the noninverting input of the amplifier. The inverting input is connected through a resistor 206 to ground. A feedback resistor 208 connects the output of amplifier 176 to the inverting input thereof. A capacitor 210 is connected between the output of the amplifier and the junction of resistors 200 and 202.

The output signal from amplifier 176 is connected through a coupling capacitor 212 to a high pass filter comprising capacitor 214 and resistor 216. The junction of this capacitor and resistor combination is connected to the noninverting input of amplifier 178. The inverting input is connected to one terminal of a resistor 218 which is connected at the opposite terminal to ground. Amplifier 178 has a resistor 220 connected between the output and the inverting input and a resistor 222 connected between the output and the junction of capacitors 212 and 214. The output from amplifier 178 is transferred through a coupling capacitor 224 to a high pass filter comprising a capacitor 226 and a resistor 228. The junction of capacitor 226 with resistor 228 is connected to the noninverting input of amplifier 180. The inverting input of this amplifier is connected to one terminal of a resistor 230 which is connected at the opposite terminal to ground. Amplifier 180 is provided with two feedback resistors. Resistor 232 is connected between the output of the amplifier and the inverting input while resistor 234 is connected from the output of the junction of capacitors 224 and 226. The output of amplifier 180 is the signal component $P_1$ which comprises the component of the input audio signal that exist in the frequency band of approximately 250 to 1100 Hz.

The high-frequency band pass filter 20 comprises the series combination of operational amplifiers 240–246. The audio signal from level limiter 16 is transmitted through an input resistor 248 to a low pass filter comprising a resistor 250 and a capacitor 252. The junction of resistor 250 and 252 is connected to the noninverting input of amplifier 240 while the inverting input is connected to one terminal of a resistor 254 which is connected at the opposite terminal to ground. A feedback resistor 256 is connected between the output of amplifier 240 and the inverting input while a feedback capacitor 258 is connected between the output and the junction of resistors 248 and 250. Bypass capacitors 260 and 262 are connected respectively to the positive and negative supply terminals of amplifier 240. Amplifiers 242, 244 and 246 are equipped with similar bypass capacitors (not shown).

The output signal from amplifier 240 is connected to an input resistor 264 which is connected in series with a low pass filter comprising resistor 266 and capacitor 268. The junction of resistor 266 with the capacitor 268 is connected to the noninverting input of amplifier 242 while the inverting input is connected to one terminal of a resistor 270 which is connected at its opposite terminal to ground. Amplifier 242 is provided with two feedback elements. A resistor 273 is connected between the output and the inverting input and a capacitor 272 is connected between the output and the junction of resistors 264 and 266.

The output signal of amplifier 242 is transmitted through a coupling capacitor 274 to a high pass filter comprising capacitor 276 and resistor 278. The noninverting input of amplifier 244 is connected to the junction of capacitor 276 with resistor 278. The inverting input is connected to one terminal of a resistor 280 which is connected at the opposite terminal to ground. Operational amplifier 244 has a feedback resistor 282 connected between the output and the inverting input and a resistor 284 connected between the output and the junction of capacitors 274 and 276.

From amplifier 244 the audio signal is transmitted through a coupling capacitor 286 to a high pass filter comprising a capacitor 288 and a resistor 290. The noninverting input of amplifier 246 is connected to the junction of capacitor 288 and resistor 290, while the inverting input is connected to one terminal of a resistor 292 which is connected at the opposite terminal to ground. A feedback resistor 294 is connected between the output of amplifier 246 and the inverting input while a resistor 296 is connected between the output of amplifier 246 and the junction of capacitors 286 and 288. The signal produced at the output of amplifier 246 is $P_2$ which is the high frequency component of the audio signal supplied by microphone 12.

Figure 4:
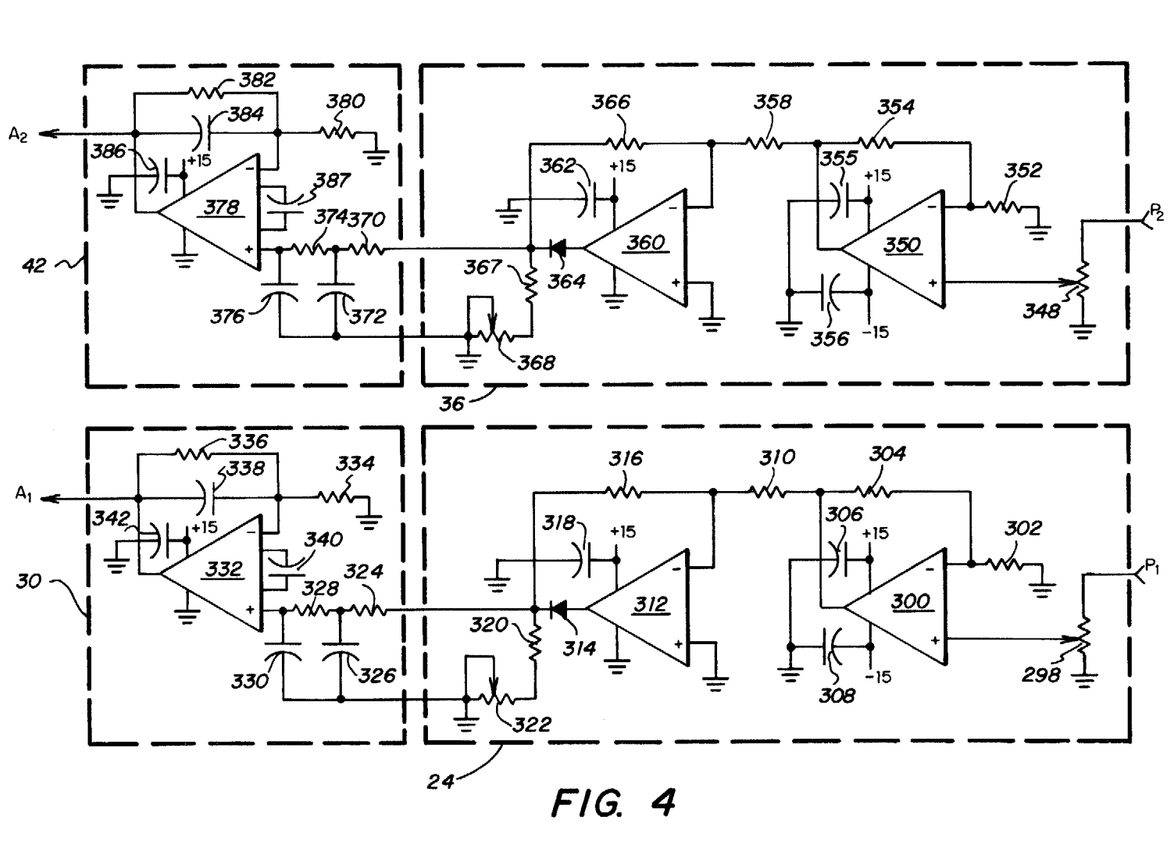
FIG. 4 is a circuit diagram of the precision rectifiers and low pass filters shown in FIG. 1.

The precision rectifiers 24 and 36 together with low pass filters 30 and 42 are shown in FIG. 4. The low frequency audio signal component $P_1$ is conveyed to a potentiometer 298 which has the opposite terminal grounded. The wiper of potentiometer 298 is connected to the noninverting input of an operational amplifier 300. The inverting input of amplifier 300 is connected to one terminal of a resistor 302 and the opposite terminal of this resistor is grounded. Amplifier 300 is provided with one feedback component, resistor 304 is connected between the output and the inverting input. Amplifier 300 is provided with bypass capacitors 306 and 308 which are connected respectively between the positive and negative power terminals and ground. Amplifier 300 serves as an input buffer for the precision rectifier, the output of the amplifier is transmitted through an input resistor 310 to the inverting input of an operational amplifier 312. The noninverting input of this amplifier is grounded. The output of amplifier 312 is connected to a diode 314. The rectified signal at the output of the diode is connected through a feedback resistor 316 to the inverting input of amplifier 312. A bypass capacitor 318 is connected to the power supply terminal of amplifier 312. The rectified output from diode 314 is also transmitted through a resistor 320 to a potentiometer 322 which has its opposite terminal and the wiper thereof grounded. Potentiometer 322 is provided to adjust the symmetry of the rectification for the incoming audio signal.

The rectified signal from diode 314 is provided to a series pair of low pass filters which comprise the combination of resistor 324 and capacitor 326 in series with the resistor 328 and capacitor 330. The output of these two low pass filters is connected to the noninverting input of an operational amplifier 332. The inverting input of amplifier 332 is connected to one terminal of the resistor 334 which is connected at the opposite terminal to ground. Amplifier 332 has a parallel combination of resistor 336 and capacitor 338 connected between its output and its inverting input. A capacitor 340 is connected to amplifier 332 to provide appropriate frequency limiting. A bypass capacitor 342 is connected from the power supply pin of amplifier 332 to ground.

The low frequency component signal $P_1$ is input to rectifier 24 where the signal is rectified and then supplied to low pass filter 30 which generates a DC output signal that is proportional to the envelope of the low frequency component signal $P_1$. The envelope signal for the low frequency component signal $P_1$ is labeled as $A_1$.

The high frequency component signal $P_2$ is input to rectifier 36 through a potentiometer 348 which is connected at one terminal to ground. The wiper of potentiometer 348 is connected to the noninverting input of an operational amplifier 350. This operational amplifier serves as an input buffer for the precision rectifier. The inverting input of amplifier 350 is connected to one terminal of a resistor 352 which has the opposite terminal grounded. A feedback resistor 354 is connected between the output of amplifier 350 and the inverting input. A pair of bypass capacitors 355 and 356 are connected respectively to the postive and negative power supply terminals of amplifier 350.

The buffered high frequency component signal from the output of amplifier 350 is transmitted through a coupling resistor 358 to the inverting input of an operational amplifier 360. The noninverting input of this amplifier is grounded. A bypass capacitor 362 is connected between ground and the postive 15 volt supply terminal of the amplifier 360. The output of amplifier 360 is connected through a diode 364 which rectifies the high frequency signal component. The output of the diode is connected through a feedback resistor 366 to the inverting input of amplifier 360. The diode output is also connected through a resistor 367 to a potentiometer 368 which has the opposite terminal and the wiper thereof grounded. Potentiometer 360 is adjusted to provide rectification symmetry.

The output of diode 364 is also transmitted to a serial pair of low pass filters comprising resistor 370 and capacitor 372 in series with resistor 374 and capacitor 376. The rectified high frequency signal charges capacitors 372 and 376. The DC signal on capacitor 376 is connected to the noninverting input of an operational amplifier 378. The inverting input of amplifier 378 is connected to one terminal of a resistor 380 which is connected at its opposite terminal to ground. Amplifier 378 has a feedback circuit comprising the parallel combination of a resistor 382 and a capacitor 384 connected between the amplifier output and the inverting input. A bypass capacitor 386 is connected between ground and the positive 15 volt supply terminal of amplifier 378. A bandwidth limiting capacitor 387 is provided with amplifier 378. The output signal of amplifier 378 is the amplitude signal $A_2$ which is a DC signal proportional to the envelope of high frequency signal component $P_2$.

Figure 5:
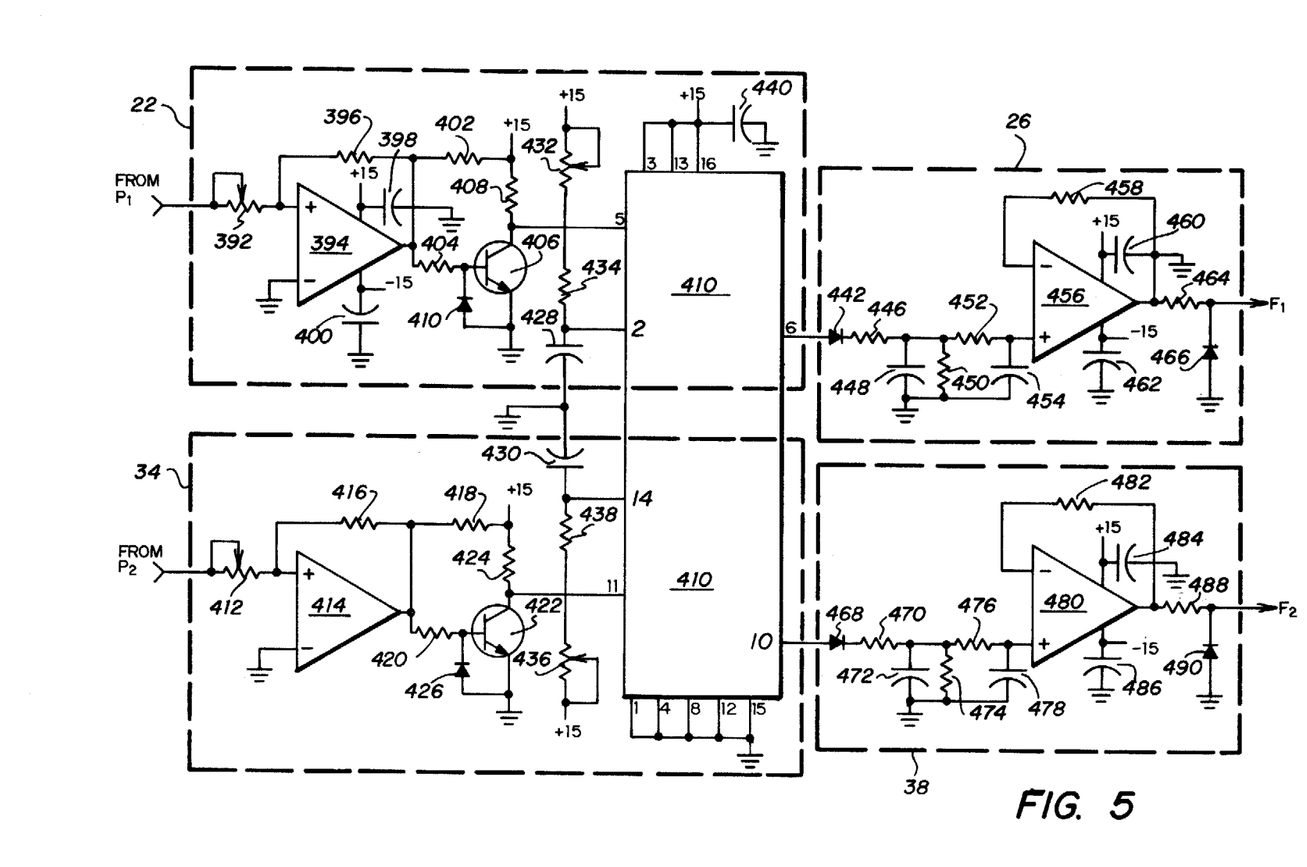
FIG. 5 is a circuit diagram of the comparators, pulse generator and low pass filters shown in FIG. 1.

The low frequency signal component $P_1$ is also input to the comparator and pulse generator 22 which is shown as a detailed schematic in FIG. 5. The signal $P_1$ is transmitted through a potentiometer 392 to the noninverting input of an operational amplifier 394. The inverting input of amplifier 394 is grounded. A feedback resistor 396 connects the output of amplifier 394 to the noninverting input. Bypass capacitors 398 and 400 are connected respectively to the postive and negative voltage supply terminals of amplifier 394. The output of amplifier 394, which is biased by a resistor 402 that is connected to a postive 15 volt source, is also connected through a base resistor 404 to a transistor 406. A collector resistor 408 connects transistor 406 to the postive 15 volt source. The emitter of transistor 406 is grounded while a diode 410 connects the emitter to the base. The amplifier 394 together with the transistor 406 generate a pulse at each zero crossover of the signal $P_1$. These pulses are generated at the collector terminal of transistor 406 then input to a dual monostable circuit 410. Circuit 410 generates constant width pulses from the comparator transition pulses provided thereto.

The high frequency signal component $P_2$ is supplied to comparator and pulse generator 34 through a potentiometer 412. The high frequency signal component is input to the noninverting input of an amplifier 414. The inverting input of this amplifier is grounded. A feedback resistor 416 connects the output of amplifier 414 to the noninverting input. The output of amplifier 414 is biased by a resistor 418 connected to the positive voltage source and is also connected through a base resistor 420 to a transistor 422. A collector resistor 424 connects transistor 422 to the postive 15 volt power source. The emitter of transistor 422 is grounded while a diode 426 connects the emitter to the base terminals. The collector of transistor 422 is connected to pin 11 of the dual monostable circuit 410. As noted above the monostable circuit 410 generates constant width pulses from the comparator transition pulses produced by amplifier 414 and transistor 422.

The dual monostable circuit 410 is provided with two pulse regulating networks comprising capacitors 428 and 430 connected between pin 2 and ground and pin 14 and ground of the monostable circuit. The postive 15 volt power source is connected through a potentiometer 432 and a resistor 434 to pin 2. The 15 volt source is likewise connected through a potentiometer 436 and a resistor 438 to pin 14. Each of the potentiometers is provided to regulate the pulse width from each half of the dual monostable. A bypass capacitor 440 is connected to the 15 volt power terminal of circuit 410.

The constant width pulses from one half of the monostable circuit 410 are output on pin 6 through a diode 442 to the low pass filter 26, which is shown in FIG. 1. The constant width pulses from diode 442 are input to a low pass frequency network comprising resistor 446 and a capacitor 448. A resistor 450 is connected in parallel with capacitor 448 which is grounded. The filtered pulse signal from the low pass filter network comprising resistor 446 and capacitor 448 is input to a second low pass filter network comprising a resistor 452 and a capacitor 454. At this point the filtered pulse signal is supplied to the noninverting input of an operational amplifier 456. Due to the filtering of the low pass networks and the high input impedance of amplifier 456 the pulse signal at the input terminal of the amplifier has been converted into a DC level signal which is proportional to the pulse rate. The operational amplifier 456 is provided with a feedback resistor 458 which is connected between the output terminal and the inverting input terminal. Power supply bypass capacitors 460 and 462 are connected respectively to the positive and negative power sources for operational amplifier 456. The output signals from amplifier 456 is transmitted through a resistor 464 which is connected to the anode of a diode 466 that is grounded at the cathode terminal. The signal present at the junction of resistor 464 and diode 466 is signal $F_1$ which is a DC signal proportional to the frequency of the signal component passed through the low frequency channel.

The monostable circuit 410 generates constant width pulses for the high frequency channel at pin 10. A diode 468 is connected to pin 10 in series with a low pass filter network comprising resistor 470 and capacitor 472. A resistor 474 is connected in parallel with capacitor 472. A second low pass filter network is connected in series with the first low pass filter network and comprises a resistor 476 and a capacitor 478. The output of this second filter network is connected to the noninverting input of an operational amplifier 480. A feedback resistor 482 is connected between the output terminal and the inverting input terminal of amplifier 480. Bypass capacitors 484 and 486 are connected respectively to the positive and negative voltage supply terminals of amplifier 480. The output from amplifier 480 is transmitted through a resistor 488 which is connected to the anode of a diode 490. The signal $F_1$ is produced at the junction of resistor 488 and diode 490 and comprises a DC signal which is proportional to the frequency of the audio signal component which is passed through the high frequency band pass filter 20.

As described to this point the circuit has produced four signals which are functions of the audio signal provided to the input of the voice recognition equipment 10 through microphone 12. Signals $F_1$ and $F_2$ are DC level signals which are proportional to the frequency of the audio component which is passed through the low and high pass filters 18 and 20 respectively. The signals $A_1$ and $A_2$ are also DC level signals but are proportional to the amplitude of the signal envelopes of the audio components which are passed through filters 18 and 20 respectively. Thus the input signal is divided into two separate frequency components and the frequency and amplitude of each of these components is converted to a DC signal. The remainder of the circuitry shown in FIG. 6 and 7 provides numerical processing for these signals to generate the output signals which characterize the original audio input signal.

Figure 6:
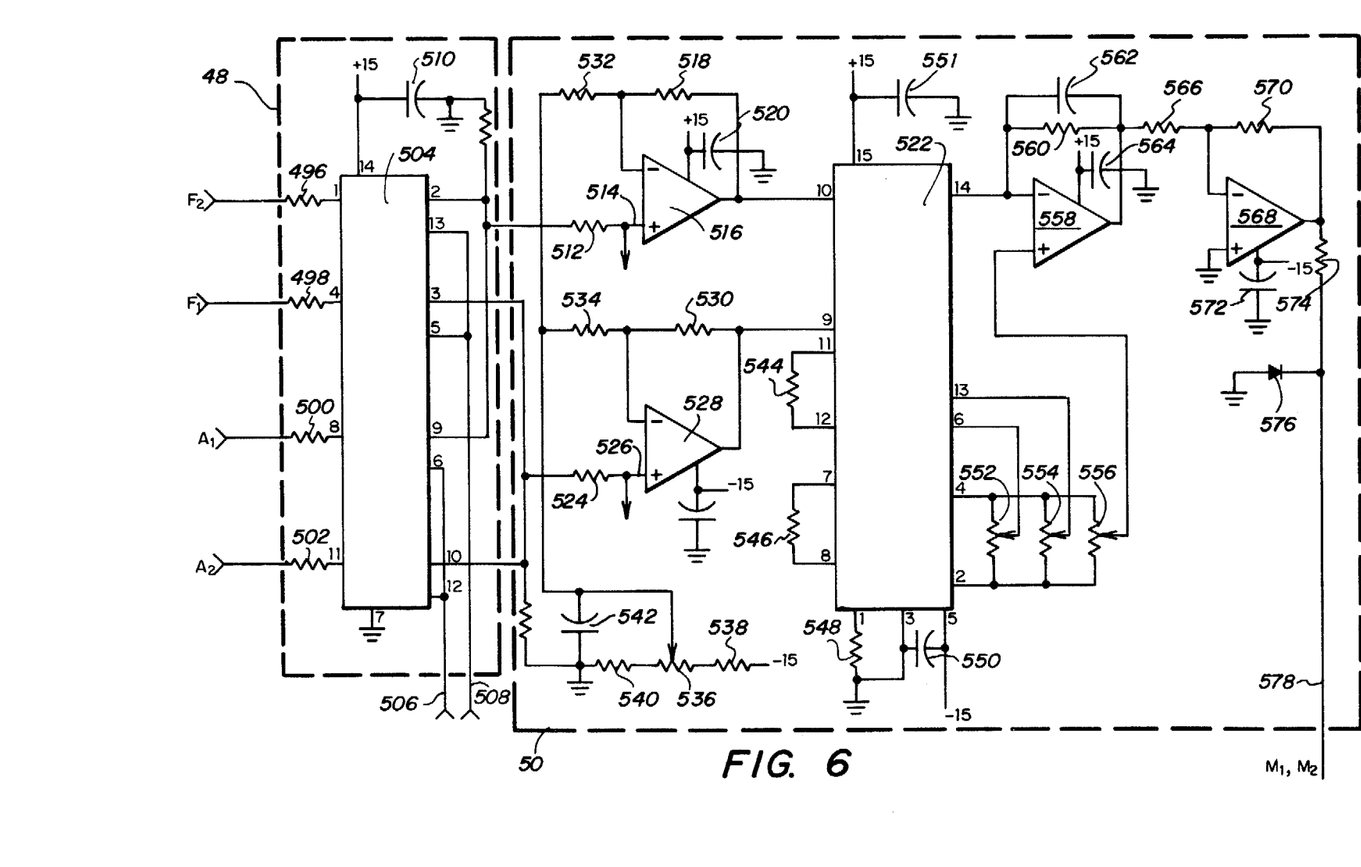
FIG. 6 is a circuit diagram of the scaled ratio detectors shown in FIG. 1.
Figure 7:
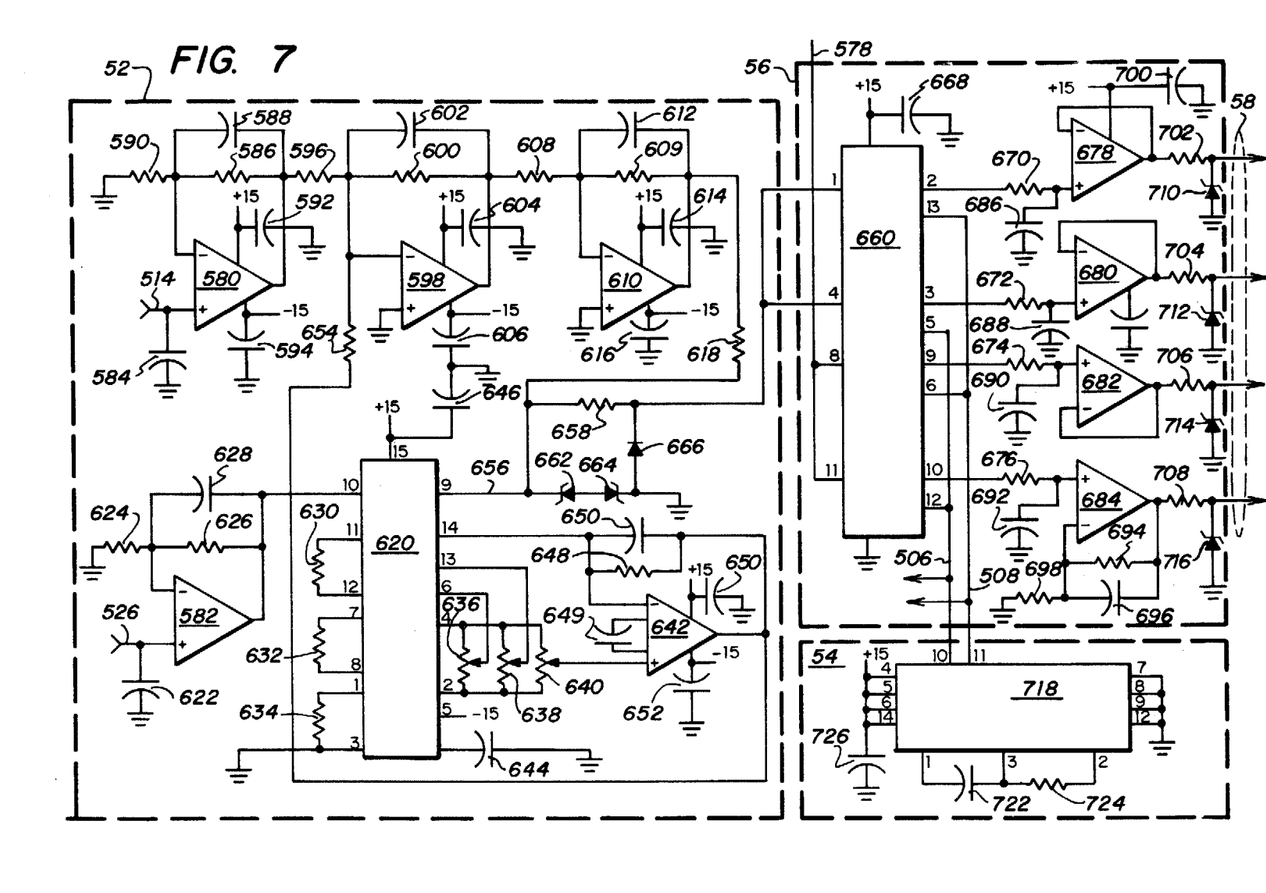
FIG. 7 is a circuit diagram of the ratio detector multiplexing circuit used in FIG. 1.

Referring to FIG. 6 the signals $F_2$, $F_1$, $A_1$ and $A_2$ are input through resistors 496-502 respectively to an analog switch 504. This switch is driven by clock signals derived from timing oscillator 54 so as to selectively route the input signals to desired output signal lines. The timing signals from oscillator 54 are received through lines 506 and 508. A bypass capacitor 510 is connected between the power supply terminal of switch 504 and ground.

Analog multiplex switch 504 connects on an alternate basis the signals $F_1$ and $F_2$ to the scaled product detector 50 and then the signals $A_1$ and $A_2$ to the same product detector. This enables one product detector to be used to perform all the multiplication functions necessary in the speech recognition circuit of the present invention. In a like manner the same signals are routed to the scaled ratio detector 52 for analog division operations.

The signals $F_2$ and $A_1$ are alternatively routed through a resistor 512 to a line 514 which is connected to the noninverting input of an operational amplifier 516. A feedback resistor 518 is connected between the output of amplifier 516 and the inverting input to control the amplifier gain. A bypass capacitor 520 is connected between ground and the postive voltage supply terminal of the operational amplifier 516. The output signal from amplifier 516 is connected to pin 10 of an analog multiplier 522.

The signals $F_1$ and $A_2$ are alternatively switched and transmitted through an input resistor 524 to a line 526 which is connected to the noninverting input of an operational amplifier 528. The amplifier 528 is provided with a feedback resistor 530 which is connected between the output and the inverting input terminals. The output signal from amplifier 528 is connected to pin 9 of the analog multiplier 522.

The inverting input terminals of amplifiers 516 and 528 are connected respectively through resistors 532 and 534 to a bias network comprising a potentiometer 536 which is connected at one terminal through a resistor 538 to the negative 15 volt source and at the opposite terminal through a resistor 540 to ground. A capacitor 542 is connected between the wiper terminal of potentiometer 536 and ground.

The analog multiplier 522 is provided with an external component network for regulating and adjusting the operation of the multiplier operation. A resistor 544 is connected between pin terminals 11 and 12 while a resistor 546 is connected between pin terminals 7 and 8. A resistor 548 is connected from pin 1 to ground and a capacitor 550 is connected between pin terminals 3 and 5 with terminal 3 being connected to ground and pin 5 being connected to the negative 15 volt power source. A bypass capacitor 551 is connected between ground and the positive 15 volt power source which is connected to pin 15. A plurality of potentiometers 552, 554 and 556 are connected in parallel between pins 4 and 2. Each of these units is a ten turn potentiometer which provides fine tuning for the multiplication operation. The wiper of potentiometer 552 is connected to pin 6, the wiper of potentiometer 554 is connected to pin 13 and the wiper of potentiometer 556 is connected to the noninverting input of an operational amplifier 558. The inverting input of amplifier 558 is connected to pin 14 of analog multiplier 522. A feedback network for amplifier 558 connects the output to the input terminal and comprises the parallel combination of a resistor 560 and a capacitor 562. A bypass capacitor 564 is connected between the positive 15 volt power source pin of amplifier 558 and ground.

The output signal from amplifier 558 is transmitted through a resistor 566 to the inverting input of an operational amplifier 568. The noninverting input of amplifier 568 is connected to ground. A feedback resistor 570 connects the inverting input terminal of amplifier 568 to the output terminal. A bypass capacitor 572 is joined to ground at one terminal and connected to the negative 15 volt power terminal of amplifier 568 at the opposite terminal. The output signal from amplifier 568 is transmitted through a resistor 574 which is connected to the anode terminal of a diode 576. The cathode terminal of diode 576 is grounded. The signal generated at the output of amplifier 568 and transmitted through line 578 is the analog product of the two input signals routed from analog multiplexer 504 to the analog multiplier 522.

The analog multiplexer 504 also routes two analog signals to the scaled ratio detector 52 shown in FIG. 7. These two signals are transmitted over lines 514 and 526 to the noninverting inputs respectively of operational amplifiers 580 and 582. The signals $F_2$ and $A_1$ are alternatively transmitted over line 514 and the signals $F_1$ and $A_2$ are alternatively transmitted over line 526. A capacitor 584 connects the noninverting input of operational amplifier 580 to ground and a feedback circuit comprising a resistor 586 in parallel with a capacitor 588 is connected between the input and output terminals of the operational amplifier. The inverting input of the operational amplifier 580 is connected to a resistor 590 which is grounded. Bypass capacitors 592 and 594 are connected respectively to the positive and negative 15 volt power supply pins of amplifier 580.

The signal produced by amplifier 580 is transmitted through a resistor 596 to the inverting input of an operational amplifier 598. The noninverting input of amplifier 598 is grounded. A feedback network comprising the parallel combination of a resistor 600 together with a capacitor 602 connects the output terminal of amplifier 598 to the inverting input terminal. Bypass capacitors 604 and 606 are connected between ground and the positive and negative 15 volt supply terminals of amplifier 598.

The output signal from amplifier 598 is transmitted through a resistor 608 to the inverting input of an operational amplifier 610. The input and output terminals of amplifier 610 are interconnected by a feedback network comprising a resistor 609 in parallel with a capacitor 612. The noninverting input of amplifier 610 is grounded. Bypass capacitor 614 and 616 are connected respectively to the positive and negative 15 volt power supply terminals of amplifier 610. The output signal from amplifier 610 is transmitted through a resistor 618 to pin 9 of an analog divider 620.

Two of the analog signals from analog multiplexer 504 are transmitted over line 526 to the noninverting input of the operational amplifier 582. A capacitor 622 connects the noninverting input of amplifier 582 to ground. The inverting input is connected to a resistor 624 which is grounded. The output terminal and inverting input terminal of operational amplifier 582 are interconnected by a parallel network of a resistor 626 and a capacitor 628. The output signal generated by amplifier 582 is connected to pin 10 of analog divider 620.

An external component network is connected to various terminals of analog divider 620 to provide control and adjustment for the division operation. A resistor 630 is connected between terminals 11 and 12, a resistor 632 is connected between terminals 7 and 8 while a resistor 634 is connected between terminals 1 and 3 with terminal 3 being grounded. A plurality of potentiometers 636, 638 and 640 are connected in parallel between pins 2 and 4 of analog divider 620. The wiper terminal of potentiometer 636 is connected to pin 6, the wiper terminal of potentiometer 638 is connected to pin 13 while the wiper terminal of potentiometer 640 is connected to the noninverting input of an operational amplifier 642. The analog divider 620 is further equipped with a bypass capacitor 644 which is connected between the negative 15 volt power terminal at pin 5 and ground. Another bypass capacitor 646 connects pin 15 which receives the positive 15 volt power source to ground.

The operational amplifier 642 is provided with a feedback network comprising a resistor 648 in parallel with the capacitor 650, the network being connected between the output terminal of amplifier 642 and the noninverting input terminal thereof. A regulating capacitor 649 is connected between selected pin terminals of the integrated circuit comprising amplifier 642. In addition bypass capacitors 650 and 652 are connected between ground and the positive and negative 15 volt power terminals of amplifier 642. The output signal produced by amplifier 642 is further transmitted through a resistor 654 to the inverting input of amplifier 598.

The output of the analog divider 620 is transmitted through a line 656 which is connected to pin 9 thereof to a resistor 658 which is connected to two inputs of an analog multiplexer 660. A pair of zener diodes 662 and 664 are connected between line 656 and ground to provide voltage regulation. Further, a diode 666 is connected between ground and the two input terminals to analog multiplexer 660 which receive the output of analog divider 620. The product signal from analog multiplier 522 is transmitted over line 578 to the remaining two inputs of analog multiplexer 660. The four output lines (pins 2, 3, 9 and 10) from multiplexer 660 are selectively connected through output buffers to the input lines 58 to analog to digital converter 60. Multiplexer 660 is provided with only one external component, that being a bypass capacitor 668 connected between ground and the positive 15 volt power source.

The output pins 2, 3, 9 and 10 of analog multiplexer 660 are connected respectively through resistors 670, 672, 674 and 676 to output buffer amplifiers 678, 680, 682 and 684. Each of noninverting input terminals of amplifiers 678-684 has a capacitor 686-692 connected respectively to ground.

Each of the operational amplifiers 678, 680 and 682 has the output terminal thereof connected directly to the inverting input terminal as a feedback line. Amplifier 684 has the output thereof connected to the inverting input terminal by the parallel combination of a resistor 694 and a capacitor 696. The inverting input terminal of amplifier 684 is connected to a resistor 698 and the remaining terminal of this resistor is grounded. Each of the amplifiers 678-684 has the positive 15 volt power supply terminal connected through a capacitor 700 to ground to bypass any transient components received from the power supply. Output resistors 702, 704, 706 and 708 are connected respectively to the output terminals of amplifiers 678, 680, 682 and 684. Zener diodes 710, 712, 714 and 716 are connected respectively to the output resistors 702, 704, 706 and 708 to limit the output voltages of the output buffering amplifiers 678, 680, 682 and 684. The transmission paths 58 are connected from the buffer amplifiers to the analog to digital conversion unit 60. The product and ratio signals thus produced on these lines are digitized by unit 60 and transmitted for storage and processing through line 62 to computer 64.

The timing oscillator 54 is connected by lines 506 and 508 to both the analog multiplexer 504 and the analog multiplexer 660. Oscillator 54 includes a timing oscillator integrated circuit 718 which is provided with external components comprising a capacitor 722 connected between pins 1 and 3 and a resistor 724 connected between pins 3 and 2. A bypass capacitor 726 is connected between pin 14 and ground.

The part numbers and the manufacturers for the various integrated circuits utilized in the present invention are listed in the following component table.

TABLE I

| Component | Part Number |
|---|---|
| Computer 64 | |
| Amplifier 90 | NE5534AN |
| Amplifiers 136, 138 158, 160 | 1458 |
| Amplifiers 174, 176 178, 180, 240, 242 244, 246, 678, 680 682, 684 | LM347 |
| Amplifiers 378, 332 | CA3130 |
| Amplifiers 300, 312 350, 360, 456, 480 | CA3140 |
| Amplifiers 394, 414 | LM393A |
| Amplifiers 516, 528 | LM353 |

TABLE I-continued

| Component | Part Number |
|---|---|
| 558, 568, 580, 582 Amplifiers 598, 610 | LM318 |
| Dual Monostable Circuit 410 | MC14528 |
| Amplifier 642 | LM308 |
| Audio Compander 114 | NE570 |
| Analog Multiplexers 504 and 660 | CD4066 |
| Analog Multiplexer 522 and Analog Divider 620 | MC1594L |
| Timing Oscillator 718 | CD4047 |

The overall operation of the present speech recognition apparatus is given in reference to FIGS. 1–7. The circuit of the present invention produces a group of digital words which are representative of an audio sound which is input to microphone 12. In practice an operator enters a word or phrase into terminal 70 and the corresponding word or phrase is spoken into microphone 12. The audio signal which comprises the word is passed through audio preamp 14 and audio level limiter 16 and is supplied to both the low frequency band pass filter 18 and the high frequency band pass filter 20. Only the respective low and high frequency signal components are passed through the respective filters. The low frequency signal component is transmitted to the comparator and pulse generator 22 as well as the precision rectifier 24 for quantizing into sequential units. The high frequency signal component is transmitted simultaneously to the comparator and pulse generator 34 and a precision rectifier 36 for quantizing into sequential units.

In the comparator and pulse generator 22, shown in detail in FIG. 5, the zero crossings of the low frequency signal are detected and a pulse is generated for each crossover. This pulse train is utilized to drive the monostable circuit 410 to produce a constant width pulse train that varies in frequency with the frequency of the low frequency signal component. This variable frequency pulse train is integrated by low pass filter 26 to produce a DC signal, $F_1$, which is proportional to the frequency of the low frequency signal component produced by filter 18.

The low frequency signal component is also input to precision rectifier 24 and the rectified signal is transmitted to and integrated by low pass filter 30. The output of the low pass filter is a signal $A_1$ which is a DC signal proportional to the amplitude of the low frequency signal component generated by low frequency band pass filter 18.

A similar set of operations is carried out for the high frequency signal component of the input audio signal. The high frequency signal component, $P_2$, is input to both the comparator and pulse generator 34 and the precision rectifier 36. In the comparator and pulse generator 34 a constant width pulse train is produced at the same frequency as the high frequency signal component. This is integrated by low pass filter 38 which produces signal $F_2$ which is a DC signal proportional to the frequency of the high frequency signal component.

Signal $P_2$ is provided to rectifier 36 for rectification and the output is transmitted to low pass filter 42 where it is integrated to produce signal $A_2$, the signal $A_2$ is a DC signal which is proportional to the amplitude of the high frequency signal component, $P_2$, which is generated by the high frequency band pass filter 20.

The four signals $F_1$, $F_2$, $A_1$ and $A_2$ are selectively routed through an analog multiplexer 48 to both a scaled product detector 50 and a scaled ratio detector 52. The product detector 50 produces two relational signals. These are $M_1$ which is the product of the frequency signals $F_1$ and $F_2$ and $M_2$ which is the product of the amplitude signals $A_1$ and $A_2$. The scaled ratio detector 52 produces relational output signals $R_1$ and $R_2$. $R_1$ is the ratio of the frequency signal $F_2$ to frequency signal $F_1$. $R_2$ is the ratio of signal $A_1$ to signal $A_2$. The two product and two ratio signals are input to the analog multiplexer 56 which selectively connects the signals to the analog to digital converter 60. Each of the signals $M_1$, $M_2$, $R_1$ and $R_2$ are digitized and input to computer 64 via line 62. The sequence of digital words produced for each sound is recorded so that it may be correlated with the word or phrase previously input through terminal 70.

Figure 8:
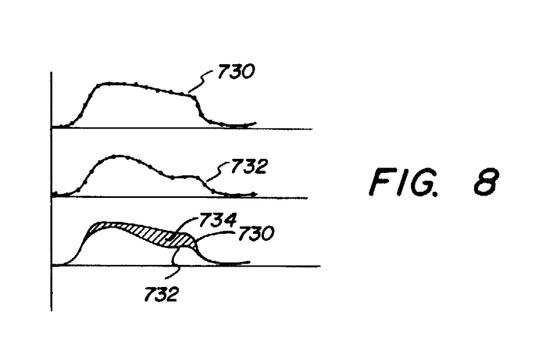
FIG. 8 is an illustration of the process for generating an original word template.

The production of template to represent the spoken word or phrase is described with further reference to FIG. 8. The following described process is carried out for each one of the signals $M_1$, $M_2$, $R_1$ and $R_2$. Each of these signals is a relational quantity rather than an absolute magnitude or normalized quantity. A relational signal is shown in FIG. 8 as line 730. This signal is digitized at the sample points shown thereon to produce a digital word representing each of the values of the signal at the points shown. In the preferred method of the present invention the word or phrase for which the template is to be produced is spoken a number of times, possibly by different persons in order to produce a template which is sufficiently general to recognize a word despite variations in the pitch and dialect of individual voices. As the word is spoken the second and succeeding times the identical processing of the signal is carried out and a new line, such as line 732 shown in FIG. 8 is produced for each spoken word. If the word were spoken in exactly the same manner as in the first instance, line 732 would correspond exactly with line 730. However, due to the differences between individual speakers and the differences in dialect these lines will not be the same. A comparison of these two lines is shown in the overlay in FIG. 8. The lines 730 and 732 are separated by an area 734 which represent the variance between the two word samples. A plurality of samples are examined and the average value is calculated for each sample point together with the average variance for each sample point. Thus two units of information are recorded for each sample point. A template is produced in this manner for each of the four relational signals $M_1$, $M_2$, $R_1$ and $R_2$. The group of templates for each word or phrase constitutes a table which corresponds to the particular word or phrase.

The initial step in carrying out speech recognition with the apparatus of the present invention is to generate a table of templates for each of the words or phrases which will make up the vocabulary for recognition. The second major step in speech recognition is to generate a table of templates for an unknown word or phrase and compare the unknown tables to each of the stored tables to find the closest correspondence. The word or phrase associated with the table with the closest correspondence is then transferred from the computer to the terminal 70 where it is displayed to the operator. The above steps are repeated for each unknown word so that the text of the input speech is produced as the words are being uttered.

The apparatus of the present invention can also be utilized to control machinery and production operations. Rather than displaying the identified input speech the computer carries out a set of mechanical operations previously recorded for the identified word.

Figure 9:
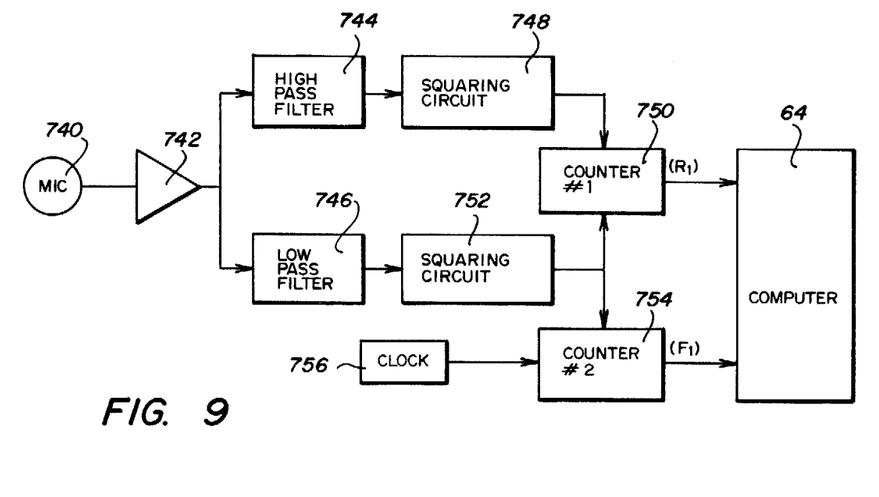
FIG. 9 is a block diagram for an alternative embodiment of the preprocessing circuitry of the present invention.

An alternative embodiment for a portion of the present invention is illustrated in FIG. 9. The analog method described above for generating the frequency proportional signals $F_1$ and $F_2$ does not in all cases have the greatest resolution which is needed to insure accurate speech recognition. A circuit for producing these two signals with greater accuracy is that shown in FIG. 9. A microphone 740 receives a speech signal which is passed through an amplifier 742 and supplied to a high pass filter 744 and the low pass filter 746. To this point the signal processing is just the same as that described in the above embodiment. The high frequency component of the audio signal is transmitted from the output of filter 744 to a squaring circuit 748. The output of the squaring circuit is input to a counter 750.

The low frequency component of the input audio signal is transmitted from low pass filter 746 to a second squaring circuit 752. The output of this squaring circuit is input to counter 750 and a second counter 754. A clock 756 supplies a time reference signal to counter 754.

The output of squaring circuit 752 controls the gate of counter 750 so that the output is a count which is the ratio of the frequency of the high frequency component as compared to the frequency of the low frequency component. This digital signal corresponds to the analog signal $R_1$. The low frequency signal component output of squaring circuit 752 is input as the gate control for counter 754. This operates to count the pulses from the clock 756 with the number of clock pulses from the second counter being proportional to the frequency of the low frequency signal component output by low pass filter 746. The output of counter 754 is a digital word which corresponds to the analog signal $F_1$. The two signal outputs of counters 750 and 754 are input to the computer 64. The computer 64 then multiples the contents of both counters for an estimate of the frequency of a high frequency signal component. The computer then multiplies that product by the output of counter 754 for an estimate of signal $M_1$ which is the product of the two frequency signals $F_1$ and $F_2$.

The advantage of the embodiment shown in FIG. 9 over the earlier described analog embodiment is that there is no loss of time resolutions since there is no need to integrate pulses to derive a DC voltage. A second advantage is that when a cycle is not detected by the squaring circuit, the previous pulse is carried over into the counter and fed to the computer. This technique eliminates the amount of erroneous data which would be transferred to the computer as a result of poor signal resolution at the end of a speech period.

The previous embodiments of the present invention have described the production of four relational signals, $M_1$, $M_2$, $R_1$ and $R_2$. There is a still further relational signal which can be produced and included in the template previously described to assist in the recognition of speech. The additional relational template is produced in the following manner. The high and low frequency signal, $F_1$ and $F_2$ are produced in the manner described for either of the above embodiments and are input to a computer and are stored as a series of numbers. The computer treats the high and low frequency signal components separately but in the same fashion. The first data point represents the starting frequency in a given word or phrase. This data point is temporarily stored and the second data point is taken and divided by the first. The resulting quotient is stored as the first data point in the template. The third data point is then taken divided by the first data point and the quotient is stored as the second data point in the template. The procedure is continued for the duration of the speech sample. The process generates two additional sets of data for each speech sample and these additional data sets are added to the original tables to represent the dynamic changes in frequency for the two separate frequency bands. These two new sets of frequency data, although derived from the frequency lines, are independent of frequency. These two additional relational signals represent the dynamically changing patterns in time which are common to all voices. These additional signals make possible greater resolution of unknown speech samples while at the same time eliminating spectral variability across speakers because the additional templates are generated by relating the spectrum to itself across frequency and across time. Thus the frequency relationships are stored and analyzed rather than the absolute frequencies themselves.

Speech recognition has been described for the present invention using relational signals $M_1$, $M_2$, $R_1$, $R_2$ and the frequency relation across time. Further relational signals can be produced by using additional band pass filters and operating with each additional signal in the manner described above. In certain applications, all of the above described signals may not be required and the desired result may be achieved with use of only one or a few of those relational signals.

The above invention has been described as an analog processing circuit which generates DC signals that are provided to an analog to digital converter and then to a computer for storage and processing. In a further embodiment, two of the signals are produced by substantially all digital processing with the resulting digital words being fed to the computer which calculates the data point values for the relational signals. In a still further embodiment of the present invention, the input signal can be filtered then digitized and digitally processed in a manner parallel to that described above to produce the same result. Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

We claim:

1. A method for producing a template representing a speech signal, comprising the steps of:
   extracting a plurality of frequency signal components ($F_n$) and amplitude signal components ($A_n$) from the speech signal,
   producing a frequency product signal which is proportional to the product ($F_n$) ($F_{n+1}$) of said frequency signal,
   producing a frequency ratio signal which is proportional to the ratio ($F_n/F_{n+1}$) of said frequency signals,
   producing an amplitude product signal which is proportional to the product ($A_n$) ($A_{n+1}$) of said amplitude signals, producing an amplitude ratio signal which is proportional to the ratio ($A_n/A_{n+1}$) of said amplitude signals, and storing the frequency product signal, the frequency ratio signal, the amplitude product signal, and the amplitude ratio signal as the template representing the speech signal.

2. A method of producing a template representing a speech signal, comprising the steps of:

extracting a plurality of frequency and amplitude signal components from the speech signal, producing a first relational signal which is the product of two of the frequency signal components, producing a second relational signal which is the product of two of the amplitude signal components, producing a third relational signal which is the ratio of two of the frequency signal components, producing a fourth relational signal which is the ratio of two of the amplitude signal components, and storing the relational signals as a template representing the speech signal.

3. Apparatus for producing a template representing a speech signal comprising:

means for filtering said speech signal to produce a plurality of output signals, each output signal corresponding to a different spectral region of the speech signal, means for detecting the zero crossings for each of the output signals from said means for filtering and generating a pulse train with a pulse occurring at each of the zero crossings, means for converting the pulse trains into frequency signals proportional to the frequency of one of the output signals, means for rectifying each of the output signals from said means for filtering and generating an amplitude signal proportional to the output signal, mathematical operational means connected to receive the frequency signals and the amplitude signals for producing one or more relational signals each of which is proportional to a plurality of either the frequency signals or the amplitude signals, and means for storing said relational signals as a template representing the speech signal.

4. Apparatus for producing a template representing a speech signal, comprising:

means for producing a plurality of frequency signals ($F_n$) and a plurality of amplitude signals ($A_n$) derived from the speech signal, multiplication means connected to receive said frequency signals and said amplitude signals for producing a frequency product signal ($F_n$) ($F_{n+1}$) which is the product of said frequency signals and for producing an amplitude product signal ($A_n$) ($A_{n+1}$) which is the product of said amplitude signals, division means connected to receive frequency signals and the amplitude signals while producing a frequency ratio which is the ratio ($F_n/F_{n+1}$) of one of the frequency signals to another of the frequency signals and for producing an amplitude ratio signal which is the ratio ($A_n/A_{n+1}$) of one of the amplitude signals to another of the amplitude signals, and means for storing said product signals and said ratio signals as the template representing the speech signal.

5. The method recited in claim 2 including the step of digitizing said relational signals for storage.

6. A method for producing a template which represents a speech signal, comprising the steps of:

extracting at least two frequency component signals from said speech signal, producing a frequency signal ($F_n$) from each of said frequency components, said frequency signals being proportional to the frequency of the respective frequency component, producing an amplitude signal ($A_n$) from each of said frequency components, said amplitude signals being proportional to the envelopes of the respective frequency component, producing a frequency product signal which is proportional to the product ($F_n$) ($F_{n+1}$) of said frequency signals, producing a frequency ratio signal which is proportional to the ratio ($F_n/F_{n+1}$) of said frequency signals, producing an amplitude product signal which is proportional to the product ($A_n$) ($A_{n+1}$) of said amplitude signals, producing an amplitude ratio signal which is proportional to the ratio ($A_n/A_{n+1}$) of said amplitude signals, and storing said product and ratio signals to serve as a template which represents said speech signal.

7. The method recited in claim 6 wherein the step of extracting comprises passing said speech signal through a plurality of band pass filters each passing a different spectral segment of said speech signal and one of said frequency component signals is produced at the output of each of said filters.

8. The method recited in claim 6 wherein the step of producing a frequency signal comprises detecting the zero crossovers of said frequency component signals, producing a pulse for each detected crossover and filtering said pulses to produce said frequency signals.

9. The method recited in claim 6 wherein the step of producing an amplitude signal comprises envelope detecting each of said frequency component signals to produce said amplitude signals.

10. The method recited in claim 6 further including the step of digitizing said product and ratio signals prior to storing said product and ratio signals.

11. A method for producing a template which represents a speech signal, comprising the steps of:

extracting one or more spectral component signals from said speech signal, quantizing said spectral component signals into sequential sample signal pulses, and producing a relational signal corresponding to each spectral component signal from the signal pulses wherein the relational signal comprises a sequence of data points, each data point comprising the product of sequential sample signal pulses and the ratio of corresponding sequential signal pulses of said quantized spectral component signal in serial order to the first sequential sample signal pulse thereof, said relational signal comprising said template.

12. The method recited in claim 11 wherein the step of extracting comprises filtering said speech signal to produce said spectral component signals.

13. The method recited in claim 11 wherein the step of quantizing said spectral component signals comprises digitizing said spectral component signals to produce digital words representing the sequential signal pulses.

14. The method recited in claim 13 wherein the step of producing a relational signal comprises sequentially dividing each of said digital words making up a spectral component signal by the first digital word of a spectral component signal, said relational signal comprising the resulting sequence of digitized words.

15. A method for producing a generalized template representing a speech pattern signal comprising the steps of:
    (a) extracting a plurality of signal components from said speech pattern signal,
    (b) generating one or more relational signals for said speech pattern signal, said relational signals generated by producing a frequency signal ($F_n$) and an amplitude signal ($A_n$) proportional to each signal component and producing frequency and amplitude product and ratio signals proportional to said frequency and amplitude signals,
    (c) repeating said speech pattern signal,
    (d) repeating steps (a) and (b) for each repeat of the speech pattern signal,
    (e) averaging the relational signals of each of said speech pattern signals with the corresponding relational signals of the other speech pattern signals to produce an average relational signal,
    (f) measuring the deviation of said relational signal of step (b) from said average relational signal to produce a deviation signal for each of said relational signals of step (b), and
    (g) storing each of said average relational signals and the corresponding deviation signals.

16. The method recited in claim 15 wherein the step of extracting a plurality of signal components comprises:
    applying said speech pattern signals to a plurality of filters, each filter passing a selected spectrum component of said speech pattern signal,
    producing said frequency signal ($F_n$) from each signal generated at the outputs of said filters, said frequency signal proportional to the frequency of the output signal from the respective filter, and
    producing said amplitude signal ($A_n$) for each of said output signals, each said amplitude signal proportional to the envelope of the output signal from the respective filter.

17. The method as recited in claim 16 wherein the step of generating one or more relational signals comprises:
    producing said frequency product signal which is proportional to the product ($F_n$) ($F_{n+1}$) of said frequency signals,
    producing said frequency ratio signal which is proportional to the ratio ($F_n/F_{n+1}$) of said frequency signals,
    producing said amplitude product signal which is proportional to the product ($A_n$) ($A_{n+1}$) of said amplitude signals, and
    producing said amplitude ratio signal which is porportional to the ratio ($A_n/A_{n+1}$) of said amplitude signals.

18. A method for producing a template which represents a speech signal, comprising the steps of:
    extracting at least two frequency component signals from said speech signal,
    applying a first of said frequency component signals to the input terminal of a gated counter,
    applying a second of said frequency component signals to the gate terminal of said counter to cause the first frequency component signal to be counted when the gate f the counter is activated by said second frequency component signal, the first frequency component signal count thus produced being proportional to the ratio of the frequency of first frequency component signal to the frequency of the second frequency component signal,
    counting the second frequency component signal to produce a second frequency signal proportional to the frequency of the second frequency component signal,
    producing a first frequency signal proportional to the frequency of said first frequency component signal by multiplying the count of said first frequency component signal by said second frequency signal,
    producing an amplitude signal from each of said frequency component signals, said amplitude signals proportional to the envelopes of the respective frequency component signal, and
    producing one or more relational signals, each of which is proportional to a plurality of signals selected from said frequency signals and said amplitude signals.

19. The method recited in claim 18 wherein the step of producing one or more relational signals comprises:
    producing a frequency product signal which is proportional to the product of said frequency signals,
    producing a frequency ratio signal which is proportional to the ratio of said frequency signals,
    producing an amplitude product signal which is proportional to the product of said amplitude signals, and
    producing an amplitude ratio signal which is proportional to the ratio of said amplitude signals.

20. A method of identifying a given speech signal by comparison with a dictionary of a plurality of templates of stored speech signals wherein each of the speech signals is converted to a template, comprising the steps of:
    extracting a plurality of signal components from each of the given speech signals,
    producing one or more relational signals, each relational signal comprising a frequency product signal, a frequency ratio signal, an amplitude product signal and an amplitude ratio signal for each of the given speech signals, each relational signal proportional to a plurality of said signal components derived from the corresponding speech signal, said relational signals comprising the templates for the given speech signals,
    storing the relational signal templates produced for the given speech signals included in said dictionary,
    comparing the relational signal template of a given speech signal with each template representing said dictionary of the plurality of stored speech signals to find the closest comparison, and
    identifying the given speech signal with the closest comparison stored speech signal.

21. The method recited in claim 20 including the steps of:
    storing words represented by each of the stored speech signals included in said dictionary, and
    displaying the word represented by the identified given speech signal from said dictionary, the displayed word corresponding to the given speech signal.

22. The method recited in claim 20 wherein the steps of extracting a plurality of signal components and producing one or more relational signals are repeated for each of a plurality of utterances for each given speech signal in said dictionary, the method further including averaging the relational signals for each utterance of each given speech signal to produce said templates, recording the deviations of the relational signals for each utterance from the averaged relational signals, and utilizing said deviations to determine the closest comparison of the template for the given speech signal to the templates in said dictionary.

23. Apparatus for producing a template to represent an audio signal comprising:
   filter means connected to receive said audio signal for passing the high frequency component thereof,
   filter means connected to receive said audio signal for passing the low frequency component thereof,
   means connected to receive said frequency components for producing a frequency signal for each frequency component, each said frequency signal proportional to the predominant frequency of the corresponding frequency component,
   means connected to receive said high frequency component for producing an amplitude signal corresponding to the envelope of said high frequency component,
   means connected to receive said low frequency component for producing an amplitude signal corresponding to the envelope of said low frequency signal,
   multiplication means connected to receive said frequency signals and said amplitude signals for producing a frequency product signal which is proportional to the product of said frequency signals and for producing an amplitude product signal which is proportional to the product of said amplitude signals,
   division means connected to receive said frequency signals and amplitude signals for producing a frequency ratio signal which is proportional to the ratio of one of said frequency signals to another of said frequency signals and for producing an amplitude ratio signal which is proportional to the ratio of one of said amplitude signals to another of said amplitude signals, and
   means for receiving and storing said product and ratio signals as a template to represent said audio signal.

24. The apparatus recited in claim 23 wherein said means connected to receive said frequency components for producing a frequency signal for each frequency component comprises:
   means for detecting the zero crossings of each of said frequency components,
   means for generating a pulse for each of said detected zero crossings to produce a pulse train for each of said frequency components, and
   means for integrating each of said pulse trains to produce said frequency signals.

25. Apparatus as recited in claim 23 wherein said means connected to receive said frequency components for producing a frequency signal for each frequency component comprises:
   a first squaring circuit connected to receive said high frequency component and produce a pulsed signal corresponding in frequency to said high frequency component,
   a second squaring circuit connected to receive said low frequency component and produce a pulsed signal corresponding in frequency to said low frequency component,
   a gated counter connected to receive and count said pulsed signal from said first squaring circuit, the gate of said counter connected to be operated by said pulsed signal from said first squaring circuit, said gated counter producing a digitized signal proportional to the ratio of said frequency signals,
   a clocked counter connected to receive and count said pulsed signal from said second squaring circuit, said clocked counter producing a digitized signal proportional to the frequency of said low frequency signal, and
   means for multiplying said digitized ratio signal by said digitized signal proportional to frequency to produce a digitized signal proportional to said high frequency component.

26. A method for producing a template to represent a speech signal, comprising the steps of:
   filtering said speech signal by means of an array of filters each passing a different spectral region of said speech signal,
   producing a frequency signal $F_n$ for each signal produced at the output of said filters, each said frequency signal being proportional to the frequency of the output signal from the respective filter,
   producing an amplitude signal $A_n$ for each of said signals produced at the output of said filters, each said amplitude signal being proportional to the envelope of the output signal from the respective filter,
   producing one or more relational signals each of which is proportional to a plurality of said frequency signals,
   producing one or more relational signals each of which is proportional to a plurality of said amplitude signals, and
   storing said relational signals to serve as a template representing the speech signal.

* * * * *